US012007166B2

(12) United States Patent
Buhles

(10) Patent No.: US 12,007,166 B2
(45) Date of Patent: Jun. 11, 2024

(54) METHOD AND DEVICE FOR DRYING BOARDS

(71) Applicant: GRENZEBACH BSH GMBH, Bad Hersfeld (DE)

(72) Inventor: Torben Buhles, Bad Hersfeld (DE)

(73) Assignee: GRENZEBACH BSH GMBH, Bad Hersfeld (DE)

( * ) Notice: Subject to any disclaimer, the term of this patent is extended or adjusted under 35 U.S.C. 154(b) by 913 days.

(21) Appl. No.: 16/980,476

(22) PCT Filed: Mar. 15, 2019

(86) PCT No.: PCT/EP2019/000080
§ 371 (c)(1),
(2) Date: Sep. 14, 2020

(87) PCT Pub. No.: WO2019/174785
PCT Pub. Date: Sep. 19, 2019

(65) Prior Publication Data
US 2021/0025653 A1 Jan. 28, 2021

(30) Foreign Application Priority Data
Mar. 15, 2018 (DE) ........................ 102018002107.7

(51) Int. Cl.
*F26B 21/00* (2006.01)
*F26B 15/12* (2006.01)
(Continued)

(52) U.S. Cl.
CPC ............ *F26B 21/004* (2013.01); *F26B 15/12* (2013.01); *F26B 21/04* (2013.01); *F26B 23/02* (2013.01); *F26B 2210/14* (2013.01)

(58) Field of Classification Search
CPC ........ F26B 21/004; F26B 21/04; F26B 15/12; F26B 23/02; F26B 2210/14
See application file for complete search history.

(56) References Cited

U.S. PATENT DOCUMENTS 1,968,874 A * 8/1934 Cobb ...................... F26B 15/00 74/606 R
3,371,427 A 3/1968 Thygeson, Sr.
(Continued)

FOREIGN PATENT DOCUMENTS

DE 1946696 A 4/1970
DE 2613512 A1 10/1977
(Continued)

OTHER PUBLICATIONS

Anonymous, “Direktantrieb-Wikipedia”, Jul. 2, 2017, Retrieved from the Internet: https://web.archive.org/web/20170702110119/https://de.wikipedia.org/wiki/Direktantrieb (retrieved on Jul. 9, 2019) “examples”.
(Continued)

*Primary Examiner* — Edelmira Bosques
*Assistant Examiner* — Bao D Nguyen
(74) *Attorney, Agent, or Firm* — Abel Schillinger, LLP

(57) ABSTRACT

In a method for drying boards, which are guided in decks through a drying device, wherein the boards (8) in the drying device are brought into contact with drying air by means of an impinging jet ventilation and wherein the impinging jet ventilation is ensured by means of transversely ventilated nozzle boxes (7), the drying air is supplied by means of at least two fans (4*a*, 4*b*) arranged next to one another in an airflow of the drying air produced by a burner (1), which guides the drying air to the fans (4*a*, 4*b*).

17 Claims, 2 Drawing Sheets

(51) Int. Cl.

| | |
|---|---|
| ***F26B 21/04*** | (2006.01) |
| ***F26B 23/02*** | (2006.01) |

(56) References Cited

U.S. PATENT DOCUMENTS

| | | | | |
|---|---|---|---|---|
| 3,529,357 | A * | 9/1970 | Hune .................... | F26B 21/004 34/446 |
| 3,940,860 | A | 3/1976 | Unterreiner | |
| 4,050,885 | A | 9/1977 | Nowick et al. | |
| 4,312,136 | A | 1/1982 | Bahner et al. | |
| 5,564,200 | A | 10/1996 | Strahm | |
| 9,200,834 | B1 | 12/2015 | Ball et al. | |
| 2003/0226277 | A1* | 12/2003 | Koslow ................... | F26B 21/02 34/492 |
| 2008/0086905 | A1 | 4/2008 | Yanes | |
| 2009/0038176 | A1* | 2/2009 | Dotzler ................... | F26B 15/18 34/236 |
| 2012/0246966 | A1* | 10/2012 | Straetmans ............. | F26B 13/10 34/451 |

FOREIGN PATENT DOCUMENTS

| | | | |
|---|---|---|---|
| DE | 102009059822 | B4 | 6/2011 |
| IT | 1072164 | B * | 4/1985 |
| JP | S5016189 | U | 2/1975 |
| JP | S58103500 | A | 6/1983 |
| JP | 2012057863 | A | 3/2012 |
| WO | 2006108398 | A1 | 10/2006 |

OTHER PUBLICATIONS

Veit Steinkamp, “Asynchronmotor”, Jan. 1, 2016, Retrieved from the Internet: https://home-telos-web.de/vsteinkamp/asynchronmotor/asynchronmotor.htm (retrieved on Jul. 9, 2019) “induction field speed”; p. 3.

* cited by examiner

METHOD AND DEVICE FOR DRYING BOARDS

BACKGROUND OF THE INVENTION

1. Field of the Invention

The invention relates to a method for drying boards, which are conveyed in decks through a drying device, wherein the boards in the drying device are brought into contact with drying air by means of an impinging jet ventilation and wherein the impinging jet ventilation is ensured by means of transversely ventilated nozzle boxes. The invention also relates to a device for drying board-shaped materials, in particular gypsum boards.

2. Discussion of Background Information

The drying of such board-shaped materials preferably occurs by means of a predominately convective heat transfer in the form of heated air flowing over the materials. The boards, which are typically arranged over a plurality of decks, are conveyed through the dryer by means of conveying installations such as roller tracks or filter belts. In accordance with the prior art, drying plants are usually operated in a mode with recirculating air. In this mode, the drying air is guided to the boards and heated after each contact. This way, the concentration of moisture in the air continues to increase; only a small portion of the drying air is emitted to the surrounding area as exhaust air in order to discharge moisture and flue gases to the surrounding area. A differentiating feature of different dryer designs is the type of airflow over the material to be dried. The aft can essentially be guided to the board in the form of a transverse ventilation, a longitudinal ventilation or a so-called impinging jet ventilation.

In transverse ventilation, the drying air is directed from the side, transversely to the direction of conveyance of the board-shaped material, over the material to be dried. Since the drying air continues to cool down during its course over the material to be dried, different drying speeds over the width ensue. This method is thus not used with sensitive materials such as gypsum boards. In longitudinal ventilation, the drying air travels over a considerable distance along the longitudinal axis of the dryer while streaming over the board and drying the latter and consequently cooling down significantly in the process. The drying air can thus be discharged at low temperatures and close to the dew point of the drying air, which is particularly advantageous from an energetic standpoint. Condensation heat can then be used in a targeted manner for the heating of fresh aft by means of a heat exchanger.

In impinging jet ventilation, the drying air is directed from the side of the drying plant into drying chambers, also referred to as nozzle boxes, and blown via air-outlet nozzles perpendicularly onto the surface of the material to be dried. From there, the air streams to the opposite side of the drying plant. Dryers that work with a similar design are meanwhile used all over the world. Their advantages include the fact that, by means of their design with a plurality of relatively short drying chambers which can respectively be individually ventilated and heated, the desired drying temperature and the climate over the length of the dryer can be selected freely. The drying conditions can thus be adapted to the needs of the material to be dried. The dryer can further be adjusted superbly, for example, in the event of product changes. Due to the good heat transfer with the impinging jet flow, these dryers can be built to be considerably shorter than comparable dryers with a longitudinal ventilation in which the air streams over the material to be dried. By adjusting the inclination of the nozzle box, a very even drying can also be obtained over the width of the material to be dried. The exhaust air of each chamber is discharged and collected separately. As this also applies to chambers with high drying temperatures required by certain processes, the result is an overall high exhaust-air temperature. Even when using a heat exchanger, it is not really possible to use the condensation heat contained in the exhaust-air moisture in a meaningful manner.

Such a plant for drying gypsum boards is described in DE 19 46 696 A. A drying chamber is configured in a manner that a heat input that is as high as possible and a drying action that is as even as possible are ensured over the width of the material to be dried.

DE 26 13 512 A1 discloses a drying apparatus in which a two-stage drying method is implemented. The heat for the second drying stage is supplied from the exhaust air of the first dryer stage by a heat exchanger connected between the same. In this design, the boards are dried in the first dryer stage at a high temperature and high air humidity and in the second dryer stage at a relatively low temperature and low air humidity. The first stage is ventilated longitudinally, the second stage transversely.

DE 10 2009 059 822 B4 discloses a method for drying boards, which are conveyed in decks through a device divided into drying chambers, wherein the boards in a drying device are brought into contact with the drying air by means of an impinging jet ventilation and wherein the impinging jet ventilation is ensured by means of transversely ventilated nozzle boxes. The drying device here is a main drying stage or a final drying stage in a drying plant.

In accordance with the disclosure of DE 10 2009 059 822 B4, drying plants for drying veneer panels or gypsum boards respectively have one recirculation fan for each drying device, the recirculation fan being arranged in the middle of the ceiling unit above a drying chamber that receives the boards. The air flow produced by the latter is, however, uneven, which is partly the result of the limited dimensions of the ceiling unit in which the fan is arranged. By means of compensatory measures, such as the implementation of screens and guide plates, attempts are made to compensate for these deficits.

The ratio of the intake height of the fan, in relation to its outer impeller diameter, in known drying devices is around a value of approximately 0.36, which does not permit the realization of an even air flow in light of the relatively low height of the ceiling unit.

It is the object of the present invention to establish a method that allows an efficient drying of a board-shaped material, in particular of gypsum boards or veneer panels.

SUMMARY OF THE INVENTION

In accordance with the invention, this object is achieved based on a method of the type described above by supplying the drying air by means of at least two fans arranged next to one another in an airflow of the drying air produced by a burner, which guides the drying air to the fans.

With the method in accordance with the invention, board-shaped materials can be dried gently by means of an impinging jet ventilation with a reduced energy expenditure.

This also applies to the use of the drying device of the present invention. This drying device comprises a ceiling unit in which a burner produces drying air, wherein the ceiling unit comprises at least two fans arranged next to one another which can be supplied with the drying air from the burner.

Advantageous embodiments are indicated in the dependent claims.

A drying device is advantageously used in which the at least two fans respectively have a direct drive. This way, fans of a simple design can be used without gearboxes or couplings.

To increase efficiency, the at least two fans are respectively enclosed by a volute housing.

The at least two fans advantageously respectively have four-pole motors, in particular asynchronous motors, with a speed of 1500 revolutions per minute. The two fans thus replace a single fan which has an eight-pole motor with a speed of 750 revolutions per minute. Eight-pole motors are more complex to manufacture and their level of efficiency is inferior to that of four-pole motors.

The fans preferably respectively have an outer impeller diameter of approximately 800 mm and are separated from one another by a central partition.

Further, in a drying device in accordance with the invention, the ratio of the intake height of the fans is at least 0.5, in particular greater than 0.8. As a result of the optimized incident flow, the blades of the fan are exploited more evenly, which increases the efficiency of the fan.

A further measure for realizing an efficient drying process lies in the ratio of the outer impeller diameter of one of the fans to the distance between an impeller and the wall of the ceiling unit on the side of the pressure chamber, wherein said ratio is greater than 3.5. The distance between the air outlet from the impeller of the fan and the dryer wall is thus large enough to render the air flow even.

The operation of the at least two fans with opposite rotations also improves the air distribution in the ceiling unit and thus ultimately in the entire drying device.

This way, the implementation of two fans in accordance with the invention, assuming an unaltered total height of the ceiling unit, permits an increased efficiency of the drying device.

BRIEF DESCRIPTION OF THE DRAWINGS

In the following, the device in accordance with the invention is described further with the aid of an illustrative embodiment. The figures show.

DETAILED DESCRIPTION OF EMBODIMENT OF THE INVENTION

Figure 1:
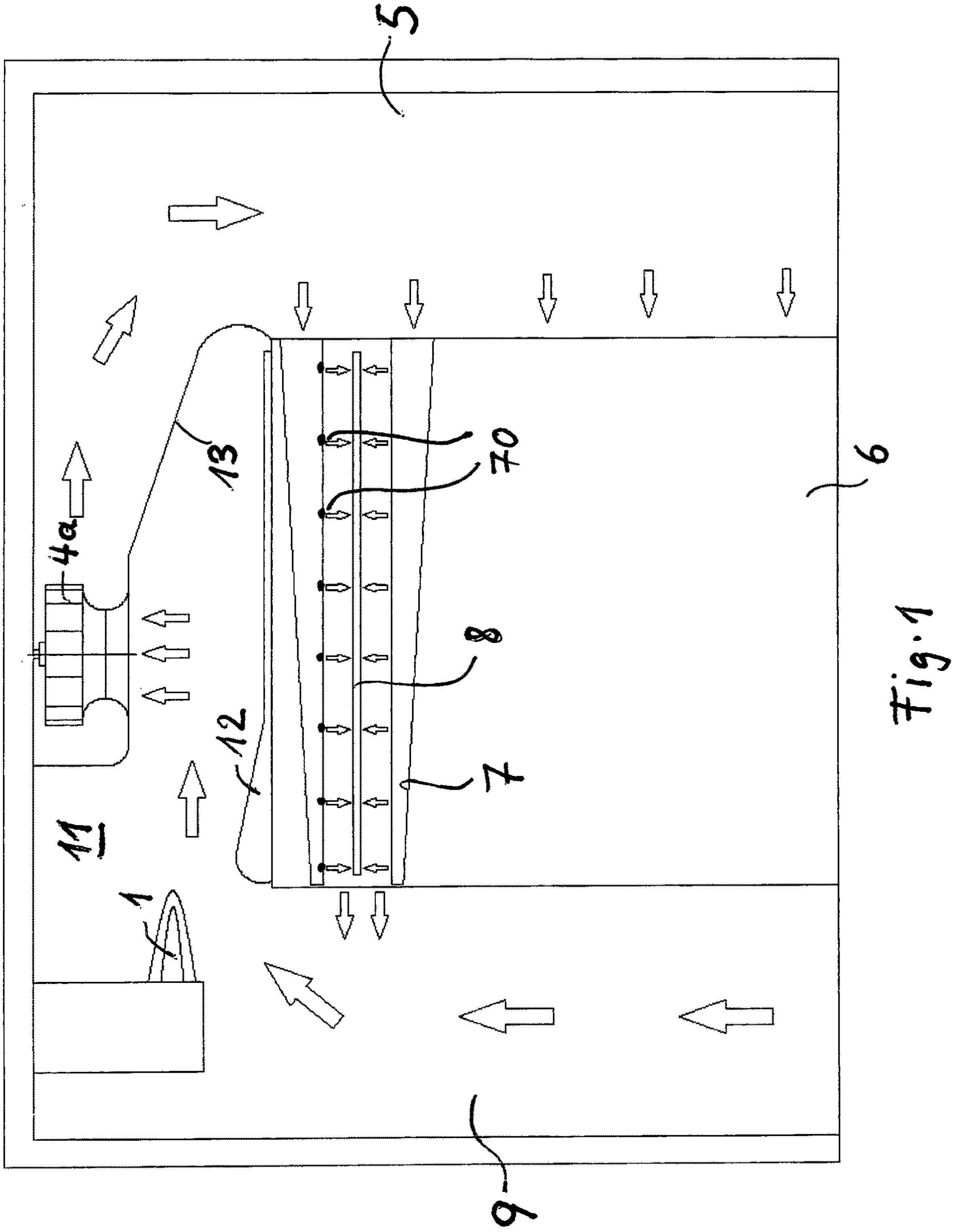
FIG. 1 a longitudinal section of a drying device.
Figure 2:
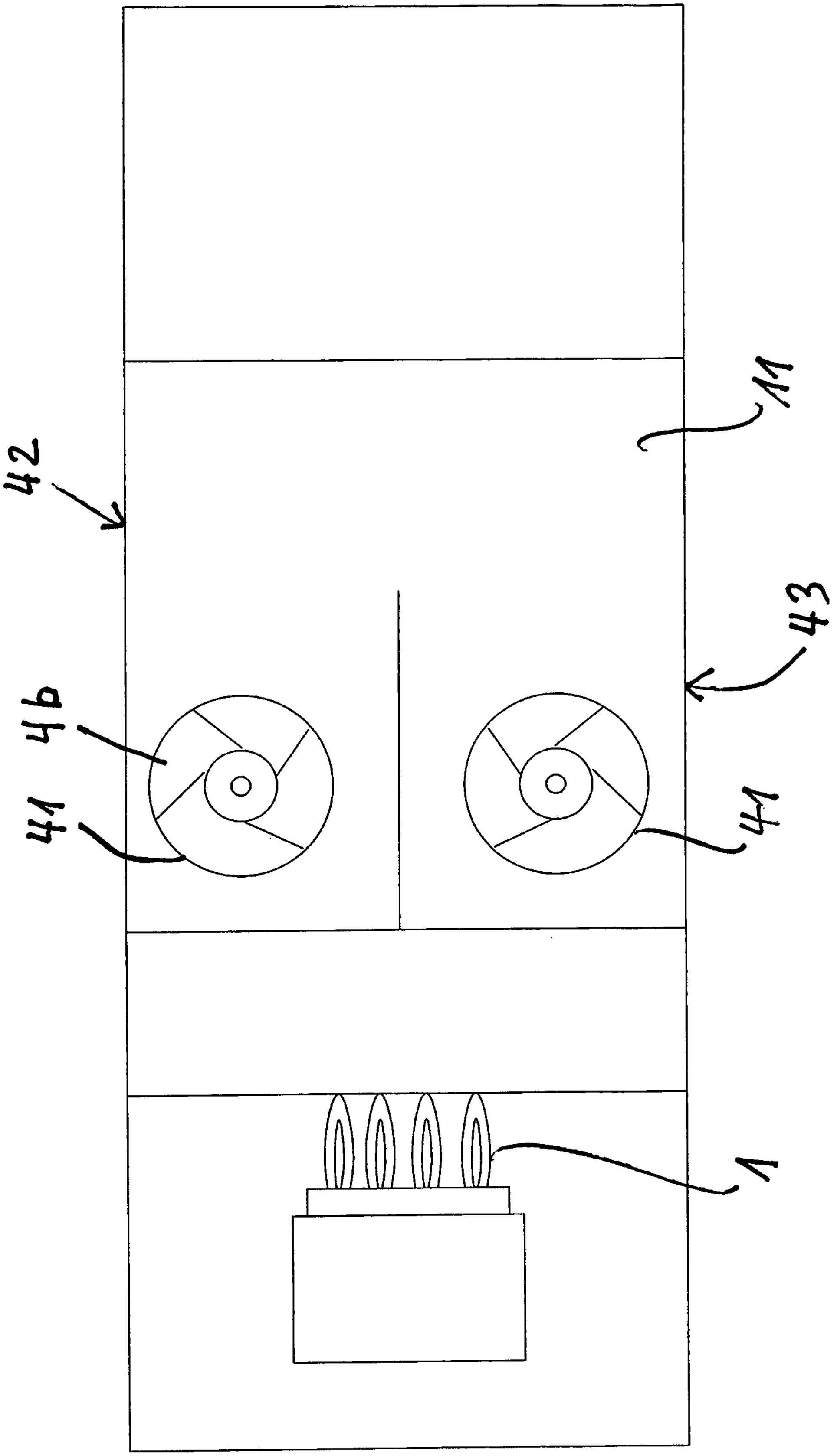
FIG. 2 a level sectional view along a section line A-A shown in FIG. 1.

Drying air flows in a drying device (FIGS. 1, 2), the direction of flow of which is indicated by arrows. Pre-heated fresh air is fed to a burner 1 as combustion air. The further conveyance of the air heated by the burner 1 into a pressure chamber 5 occurs via recirculation fans 4*a*, 4*b* (FIG. 2). The pressure chamber 5 serves to distribute the air evenly into the individual decks of a drying chamber 6. In the process, the air is first pressed into nozzle boxes 7 (merely one of which is depicted illustratively in FIG. 1), from which it is blown perpendicularly onto gypsum boards 8 or other boards to be dried via hole nozzles 70 (only a few hole nozzles 70 are depicted illustratively in FIG. 1), which for the sake of clarity are only illustrated in the upper drying level of the drying chamber 6 and which are arranged on the top or bottom side of the nozzle boxes. The boards 8 lie on supports (not illustrated here), such as e.g. supporting rollers, and are conveyed by means of a transport installation (also not described here further) in a direction perpendicular to the viewing plane.

In order to ensure an even distribution of the air over the width, the nozzle boxes 7 are configured to be tapered in the direction of flow of the air. The air escaping from the nozzle boxes 7 via the hole nozzles 70 then flows above and below the boards 8 into a vacuum chamber 9. A part of the air, which in sum essentially corresponds to the combustion gases, the fresh air and the water vapour generated by the drying action, escapes via an exhaust-air outlet. The air flow circuit is completed at the burner 1. The section above the pressure chamber 5, the drying chamber 6 and the vacuum chamber is the ceiling unit 11, also referred to as the overhead unit.

The fans 4*a*, 4*b* arranged in the ceiling unit 11 are arranged next to one another at a distance from the burner 1 and separated from one another by a partition 40. Both fans 4*a*, 4*b* are respectively enclosed by a volute housing 41. Both fans 4*a*, 4*b* are preferably arranged eccentrically in the area between the partition 40 and an outer wall 42 or 43 of the ceiling unit 11, wherein they are mounted closer to the outer walls 42, 43 than to the partition 40. It has been shown that, this way, for reasons relating to fluid dynamics, a more even supply of the drying air into the pressure chamber 5 is achieved.

The ratio of the outer impeller diameter of each fan 4*a*, 4*b* to a distance d between a lateral impeller outlet of the air exiting the fans 4*a* and 4*b* and a wall 50 of the ceiling unit 11 above the pressure chamber 5 is greater than 3.5.

For guiding the drying air exiting the burner to the underside of the fans 4*a*, 4*b*, an air guiding profile 12 and a wall 13 are provided.

What is claimed is:

1. A method for drying boards, wherein the method comprises guiding the boards through a drying device, bringing the boards in the drying device into contact with drying air by an impinging jet ventilation, the impinging jet ventilation being ensured by transversely ventilated nozzle boxes, and the drying air being heated by a single burner in a ceiling unit arranged above the nozzle boxes and being supplied to at least two fans arranged next to one another in an air flow of the drying air and thereafter being passed to a pressure chamber which is located at a side of the nozzle boxes, the drying device comprising the ceiling unit in which the single burner heats the drying air, and the ceiling unit comprising the at least two fans arranged next to one another and in a way such that they can be supplied with the heated drying air from the single burner, and a ratio of an intake height of the at least two fans, in relation to an outer impeller diameter, being at least 0.5.

2. The method of claim 1, wherein each of the at least two fans comprises a direct drive.

3. The method of claim 1, wherein each of the at least two fans is enclosed by a volute housing.

4. The method of claim 1, wherein each of the at least two fans comprises a four-pole motor or an asynchronous motor.

5. The method of claim 1, wherein the ratio of the intake height of the at least two fans, in relation to the outer impeller diameter, is greater than 0.8.

6. The method of claim 1, wherein a ratio of the outer impeller diameter of one of the at least two fans to a distance between a lateral impeller outlet for drying air exiting the at least two fans and a wall of the ceiling unit above the pressure chamber and adjacent to the nozzle boxes is greater than 3.5.

7. The method of claim 1, wherein the at least two fans can be operated with opposite rotations.

8. The method of claim 1, wherein the nozzle boxes are tapered in a direction of flow of air.

9. The method of claim 1, wherein the at least two fans are separated by a partition.

10. The method of claim 1, wherein the at least two fans are arranged in the ceiling unit in a way such that they are capable of sucking heated air from the single burner into the at least two fans from below and passing it through lateral impeller outlets into the pressure chamber.

11. A method for drying boards, wherein the method comprises guiding the boards through a drying device, bringing the boards in the drying device into contact with drying air by an impinging jet ventilation, the impinging jet ventilation being ensured by transversely ventilated nozzle boxes, and the drying air being heated by a single burner in a ceiling unit arranged above the nozzle boxes and being supplied to at least two fans arranged next to one another in an air flow of the drying air and thereafter being passed to a pressure chamber which is located at a side of the nozzle boxes, the drying device comprising the ceiling unit in which the single burner heats the drying air, and the ceiling unit comprising the at least two fans arranged next to one another and in a way such that they can be supplied with the heated drying air from the single burner, and a ratio of an outer impeller diameter of one of the at least two fans to a distance between a lateral impeller outlet for drying air exiting the at least two fans and a wall of the ceiling unit above the pressure chamber and adjacent to the nozzle boxes being greater than 3.5.

12. The method of claim 11, wherein each of the at least two fans comprises a direct drive.

13. The method of claim 11, wherein each of the at least two fans is enclosed by a volute housing.

14. The method of claim 11, wherein each of the at least two fans comprises a four-pole motor or an asynchronous motor.

15. The method of claim 11, wherein the at least two fans can be operated with opposite rotations.

16. The method of claim 11, wherein the nozzle boxes are tapered in a direction of flow of air.

17. The method of claim 11, wherein the at least two fans are separated by a partition.

* * * * *